US008601855B1

(12) United States Patent
Hamm et al.

(10) Patent No.: US 8,601,855 B1
(45) Date of Patent: Dec. 10, 2013

(54) VISE APPARATUS WITH A BENDING FIXTURE

(71) Applicants: James E. Hamm, Grafton, OH (US); Prasad Chatursingh Patil, Maharashtra (IN); Sachin Shashikant Dakare, Maharashtra (IN); Mahesh Janardan Patil, Maharashtra (IN); Nilesh Vidyadhar Puntambekar, Pune (IN)

(72) Inventors: James E. Hamm, Grafton, OH (US); Prasad Chatursingh Patil, Maharashtra (IN); Sachin Shashikant Dakare, Maharashtra (IN); Mahesh Janardan Patil, Maharashtra (IN); Nilesh Vidyadhar Puntambekar, Pune (IN)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 13/629,806

(22) Filed: Sep. 28, 2012

(30) Foreign Application Priority Data

Jun. 13, 2012 (IN) ......................... 1720/MUM/2012

(51) Int. Cl.
*B21D 9/08* (2006.01)
*B23G 5/04* (2006.01)

(52) U.S. Cl.
USPC ............. 72/389.1; 72/380; 72/389.2; 72/460; 269/131; 269/168

(58) Field of Classification Search
USPC ..................... 72/380, 389.1, 389.2, 459, 460; 269/131, 168
See application file for complete search history.

(56) References Cited

U.S. PATENT DOCUMENTS 4,349,931 A * 9/1982 Leon ............................ 470/207
5,651,283 A * 7/1997 Runciman et al. ........... 72/390.4

* cited by examiner

*Primary Examiner* — David B Jones
(74) *Attorney, Agent, or Firm* — Mark E. Bandy; Rankin, Hill & Clark LLP

(57) ABSTRACT

A vise apparatus with a bending fixture is disclosed in which the bending fixture includes a collection of projections on an operative and substantially vertical front face of a holding arrangement of the vise apparatus. The bending fixture supports and enables gravity assisted bending of a workpiece. The vise apparatus promotes bending workpieces with reduced effort and minimizes manufacturing costs.

19 Claims, 26 Drawing Sheets

VISE APPARATUS WITH A BENDING FIXTURE

CROSS REFERENCES TO RELATED APPLICATIONS

This application claims priority upon Indian patent application Serial No. 1720/MUM/2012 filed on Jun. 13, 2012.

FIELD

The present disclosure relates to a vise apparatus for holding or clamping a workpiece.

BACKGROUND

A vise apparatus having a base portion is typically used to hold a workpiece which is to be machined or otherwise operated upon. There are various types of vises such as for example, a machinist's bench vise, a bench and pipe vise, a clamp base bench vise, a bench chain vise, and a bench yoke vise. The vise apparatus is typically fixed to a workbench to enable an operator to hold the workpiece firmly and perform a variety of machining operations such as drilling, cutting, and threading.

Generally, a vise apparatus consists of a holding arrangement to hold the workpiece at one end and support the workpiece at the other end. Usually, the holding arrangement in the vise apparatus, particularly in a bench yoke vise, consists of a clamping arrangement in order to clamp the workpiece by a pair of jaws. Typically, in such clamping arrangements, one of the jaws is fixed and the other jaw is displaceable so as to enable a workpiece with varied sizes and shapes to be operated on while clamped by the vise apparatus.

Usually, a workpiece with a regular and defined surface can readily be held in between the jaws of a vise apparatus. However, for a workpiece having an irregular or an undefined surface, a chain like structure is typically used for clamping the workpiece in the vise apparatus.

Once the workplace is firmly positioned and retained within a vise apparatus, various machining processes like cutting, threading, etc., can be performed on the workpiece. Additionally, in certain applications, bending operations are required to be performed on the workpiece. Bending operations typically performed on the workpiece generally involve incremental bending. However, it is not feasible to perform bending operations on the workpiece while in a clamped position. Hence, a separate arrangement or device is required for performing bending operations on the workpiece.

However, shifting the workpiece from one work bench or device to another for performing the bending operations and the machining operations on the workpiece is time consuming because such shifting involves multiple clamping and removing operations of the workpiece.

Bending fixtures provided on a vise apparatus are known so as to enable multiple operations at a single workbench and on the same vise apparatus. However, a conventional vise apparatus with a bending fixture is typically limited in the range of positions and orientations in which the workpiece can be placed prior to and during the bending operations.

Accordingly, a need exists for a vise apparatus that includes a bending fixture which addresses the drawbacks of conventional vise apparatuses with bending fixtures.

SUMMARY

Some of the objects of the present disclosure aimed to address one or more problems of the prior art or to at least provide a useful alternative are described herein below.

An object of the present disclosure is to provide a multi-functional vise apparatus.

Another object of the present disclosure is to provide a vise apparatus which enables bending operations that are easy to perform by an operator.

Yet another object of the present disclosure is to provide a vise apparatus which enables easy insertion of a workpiece for bending operations.

Further, another object of the present disclosure is to provide a vise arrangement that involves a reduced number of steps in positioning the workpiece for bending operations.

Still another object of the present disclosure is to provide a vise apparatus that is cost effective.

Yet another object of the present disclosure is to provide a vise apparatus that enables reducing unproductive man hours.

Other objects and advantages of the present disclosure will be more apparent from the following description when read in conjunction with the accompanying figures, which are not intended to limit the scope of the present disclosure.

In accordance with one aspect of the present disclosure, a vise apparatus is provided which includes a base portion and a holding arrangement for holding an elongated workpiece to be operated thereon. The vise apparatus comprises a bending fixture having at least one projection. The bending fixture supports and enables gravity assisted bending of the elongated workpiece.

In accordance with another aspect of the present disclosure, a vise apparatus and bending fixture is provided which comprises a base portion, and a jaw arrangement including a recessed receiving region and one or more toothed jaws. At least one of the base portion and the jaw arrangement provides a substantially vertical front face. And, at least one projection extends from the front face. The at least one projection is adapted for contact with a workpiece during bending of the workpiece.

In accordance with another aspect of the present disclosure, a vise apparatus and bending fixture is provided which comprises a base portion, a jaw arrangement disposed on or adjacent to the base portion, the jaw arrangement including at least one jaw member, and a support disposed on or adjacent to the base portion and spaced from the at least one jaw member by the base portion extending therebetween. At least one of the base portion, the jaw arrangement, and the support provide a substantially vertical front face. And the apparatus and bending fixture also comprises a first projection extending from the front face and a second projection extending from the front face. The first projection and the second projection constitute the bending fixture for receiving a workpiece and bending the workpiece upon application of a force to the workpiece.

Typically, the bending fixture is located on an operative and substantially vertical front face of the holding arrangement.

Typically, the at least one projection has a predetermined shape selected from the group consisting of a spool shape, a bobbin shape, a hemi-capstan shape and an arcuate shape.

Alternatively, the at least one projection is an element with a through hole. Typically, the through hole has a predetermined profile for bending the workpiece.

Alternatively, the at least one projection is an element with an arcuate shaped member extending from a neck portion. The arcuate shaped member is substantially orthogonal to the neck portion. The neck portion extends from a plane substantially perpendicular to the front face of the holding arrangement.

Typically, the bending fixture is integral with the operative and substantially vertical front face of the holding arrangement.

Alternatively, at least one of the projections is displaceable.

Alternatively, the operative and substantially vertical front face of the holding arrangement is provided with locational holes for fitting the bending fixture.

Alternatively, the bending fixture has a front bending portion and a threaded stem. The threaded stem is adapted to be threadably fitted to the locational hole.

Typically, the bending fixture is provided on the operative front face of the holding arrangement by a method selected from the group consisting of casting, threading, fastening, welding and press fitting.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

Preferred embodiments of the vise apparatus with a bending fixture of the present disclosure will now be described in detail with reference to the accompanying drawings. The preferred embodiments do not limit the scope and ambit of the disclosure. The description provided is purely by way of example and illustration.

DETAILED DESCRIPTION OF THE EMBODIMENTS

Preferred embodiments of the vise apparatus with a bending fixture of the present disclosure will now be described in detail with reference to the accompanying drawings. The preferred embodiments do not limit the scope and ambit of the disclosure. The description provided is purely by way of example and illustration.

The embodiments herein and the various features and advantageous details thereof are explained with reference to the non-limiting embodiments in the following description. Descriptions of well known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The following description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

In this specification, the following terms have the following definitions as given alongside. These are additions to the usual definitions expressed in the art.

The expression "workpiece" used in the specification refers to an elongated structure, such as, a rod, a tube, a pipe etc. upon which clamping and bending operations are to be performed.

Figure 1:
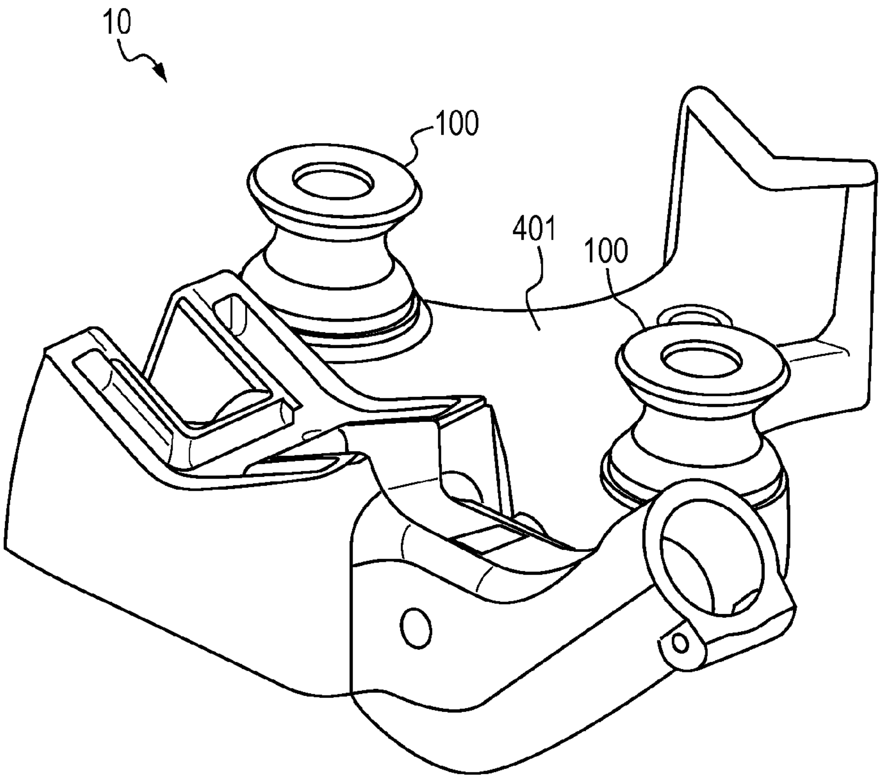
FIG. 1 (PRIOR ART)
FIG. 1 illustrates a perspective view of a prior art vise apparatus with a bending fixture.
Figure 2:
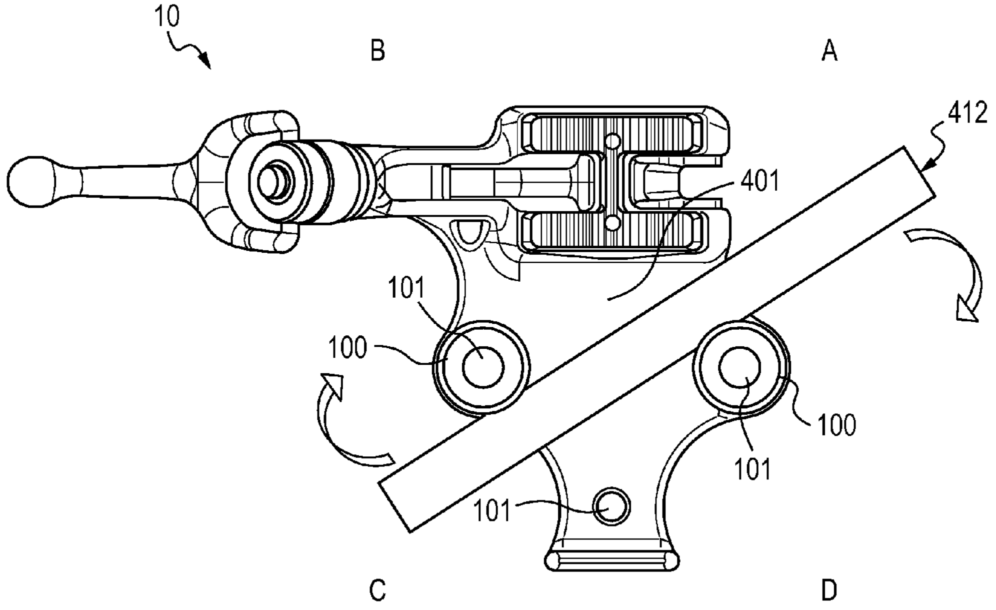
FIG. 2 (PRIOR ART)
FIG. 2 illustrates the prior art vise apparatus with a bending fixture of FIG. 1 with a handle and having a workpiece positioned therein.

FIG. 1 and FIG. 2 illustrate a vise apparatus 10 having a base portion 401 with a bending fixture in accordance with the prior art. The vise apparatus 10 has three apertures 101 for fixing the vise apparatus 10 on a workbench. The bending fixture includes a plurality of projections 100, removably fitted to two of the apertures 101. The plurality of projections

100 is arranged on the base portion of the vise apparatus 10 for providing a bending feature. A workpiece 412 is inserted between the projections 100, as shown in FIG. 2, for performing the bending operation.

FIG. 2 illustrates the limited directions and angles available to insert and pull the workpiece 412 from side A and side C of the vise apparatus 10. This presents difficulties in inserting and pulling the workpiece 412 from side B and side D.

Figure 3:
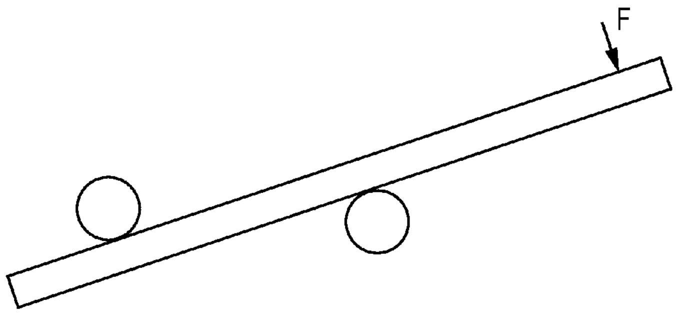
FIG. 3 illustrates a schematic representation of a bending force diagram of the prior art vise apparatus with the bending fixture and workpiece of FIG. 2.
Figure 4:
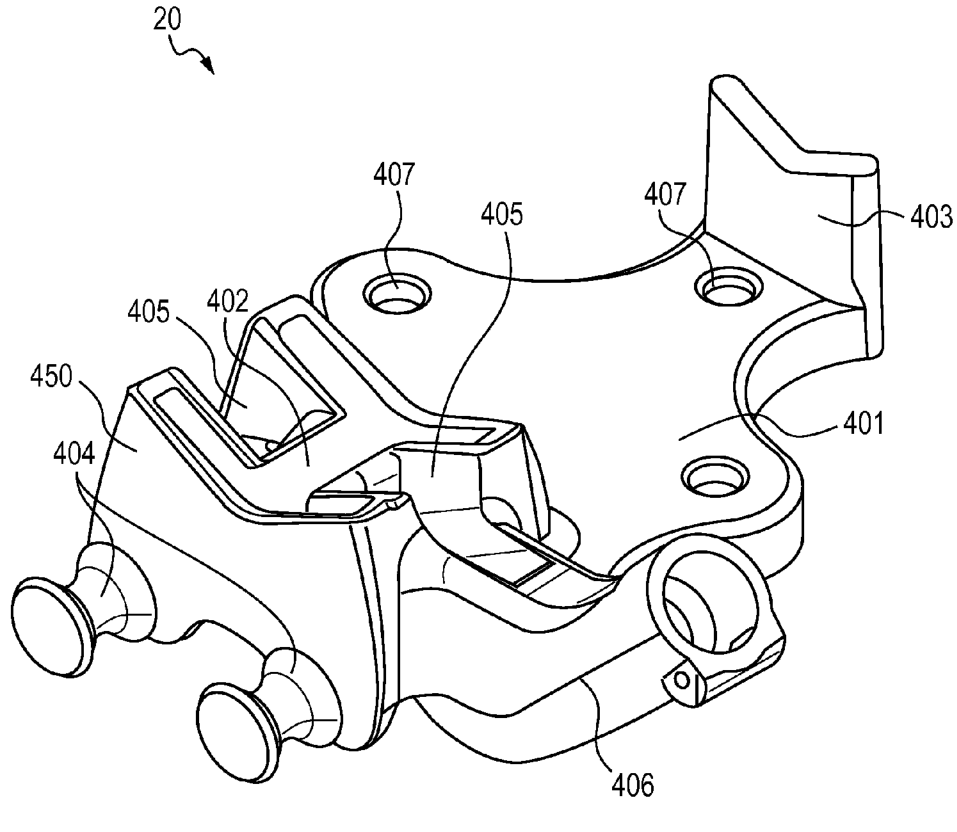
FIG. 4 to FIG. 6 illustrate different perspective views of a vise apparatus with a bending fixture in accordance with the present subject matter.
Figure 5:
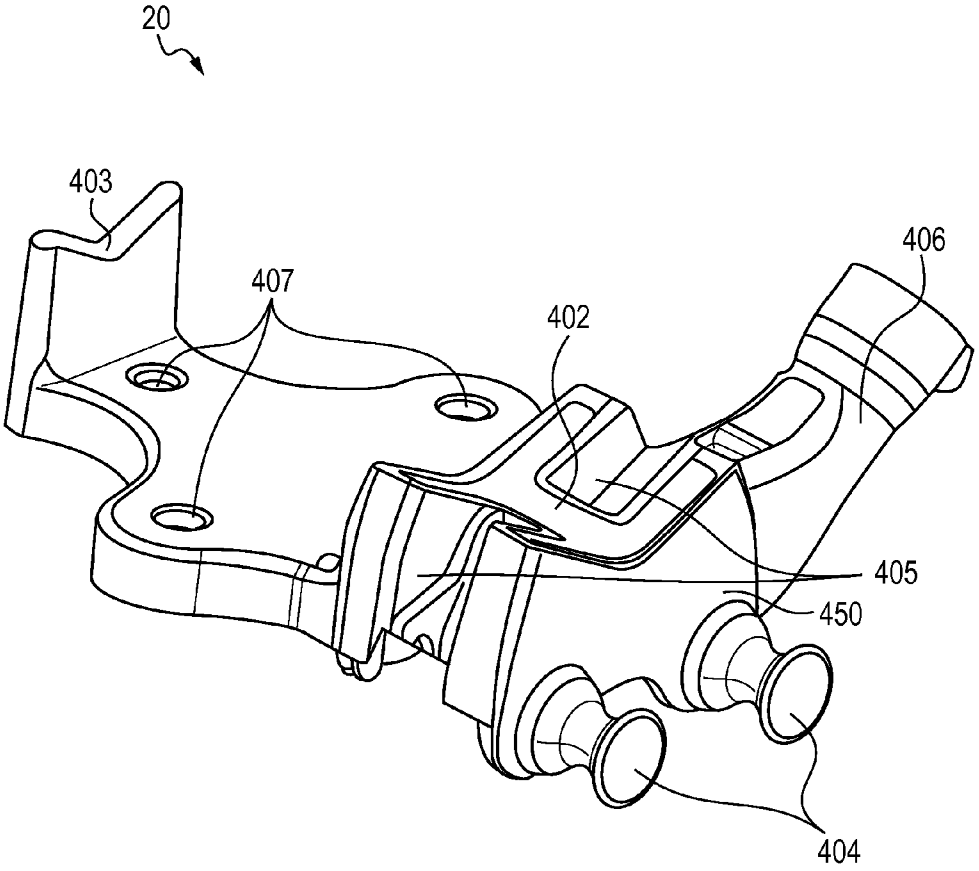
Figure 6:
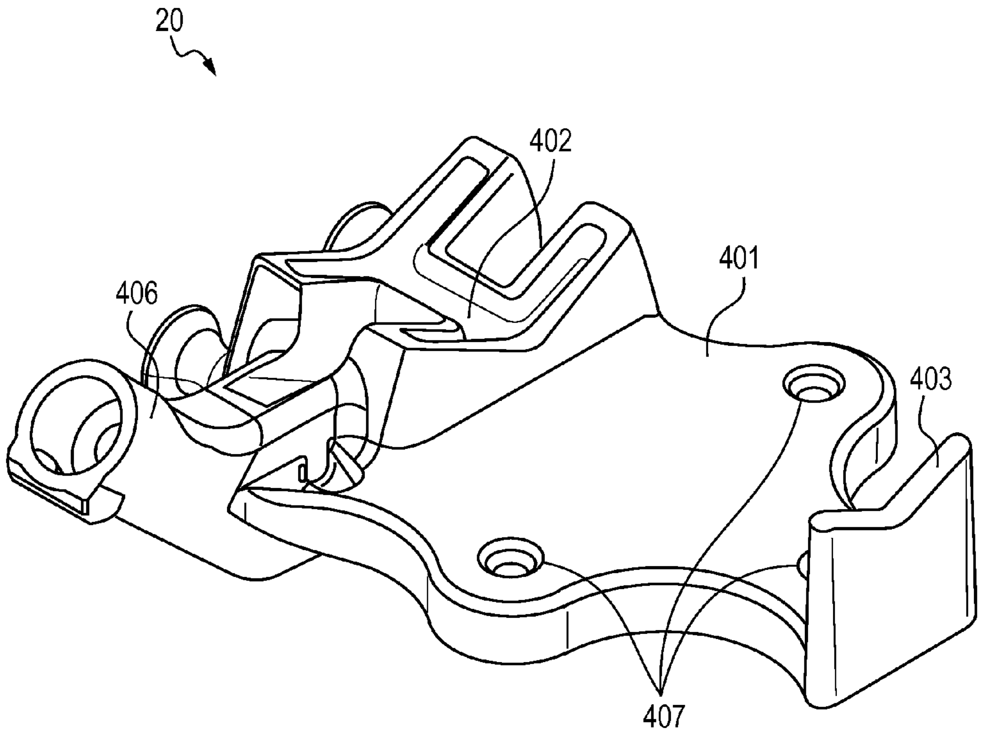
Figure 7:
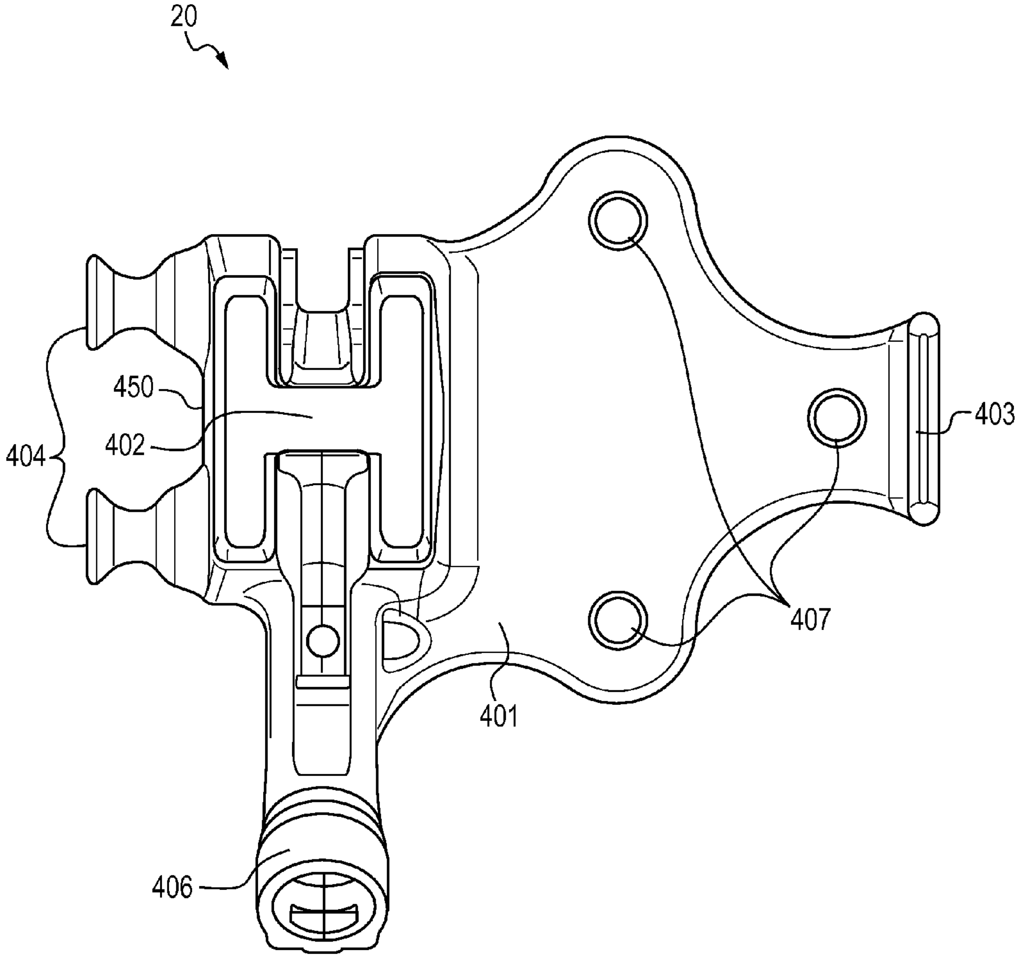
FIG. 7 illustrates a top view of the vise apparatus with the bending fixture shown in FIG. 4 to FIG. 6.
Figure 8:
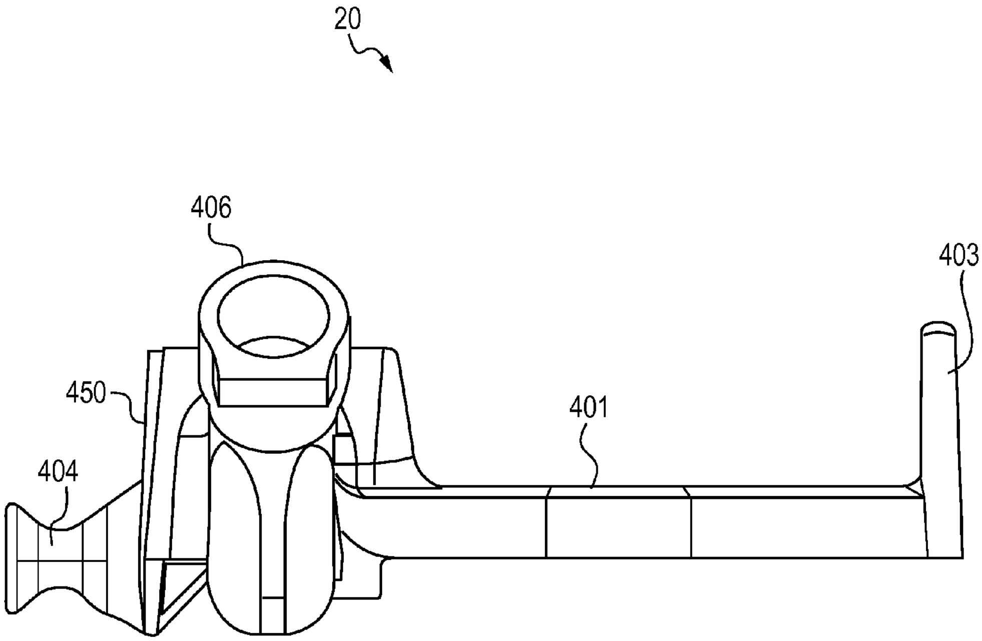
FIG. 8 illustrates a right side view of the vise apparatus with the bending fixture shown in FIG. 4 to FIG. 6.
Figure 9:
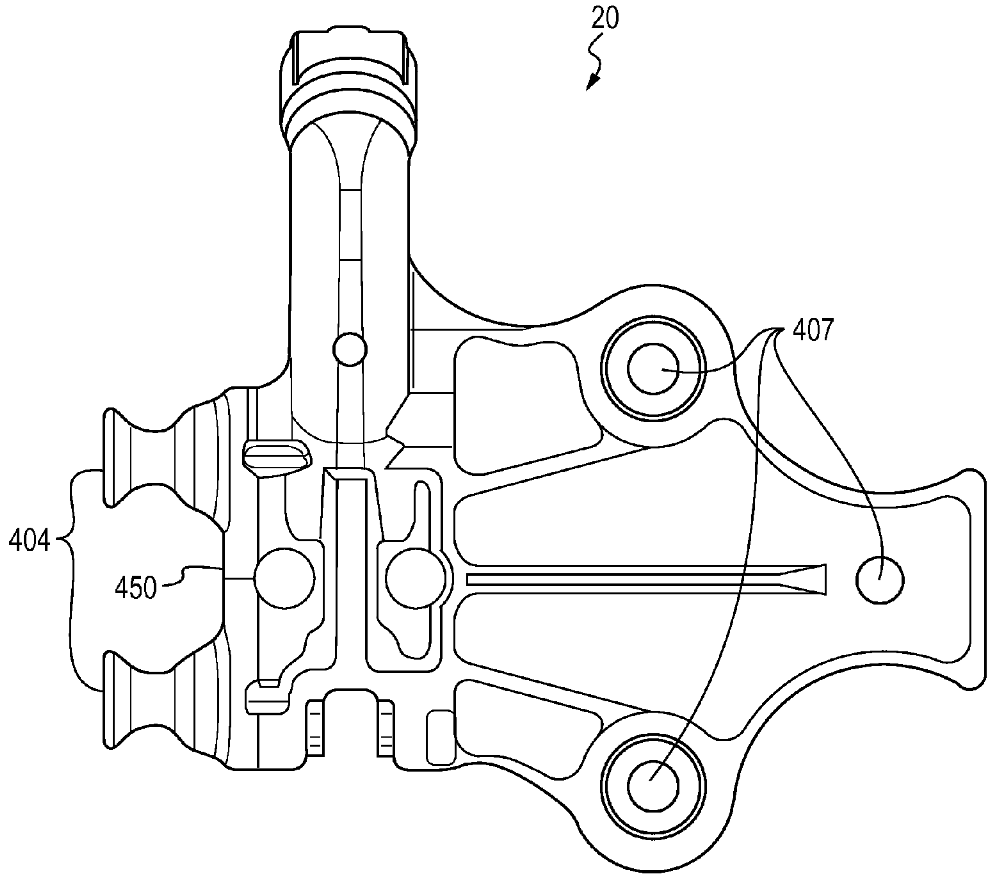
FIG. 9 illustrates a bottom view of the vise apparatus with the bending fixture shown in FIG. 4 to FIG. 6.
Figure 10:
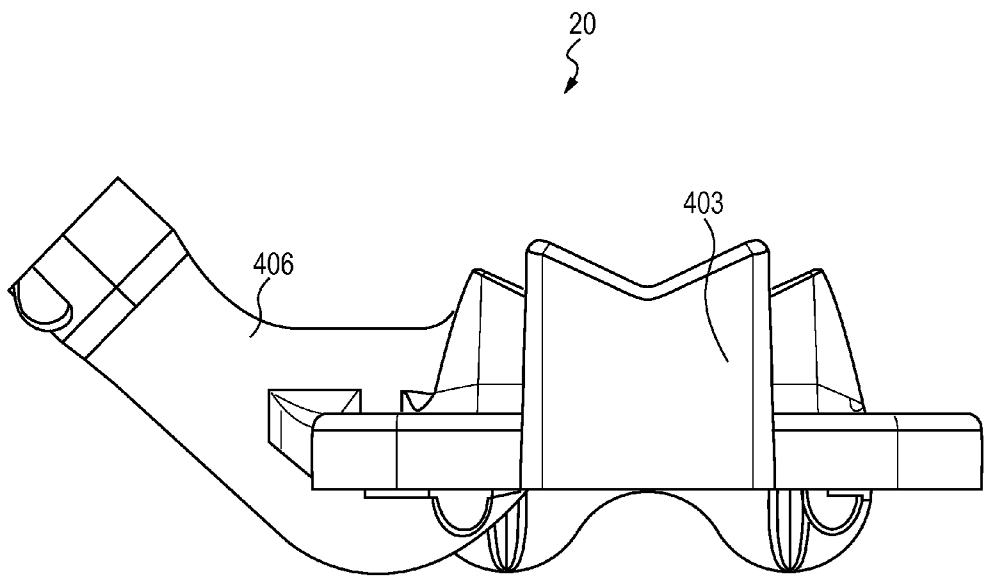
FIG. 10 illustrates a rear view of the vise apparatus with the bending fixture shown in FIG. 4 to FIG. 6.
Figure 11:
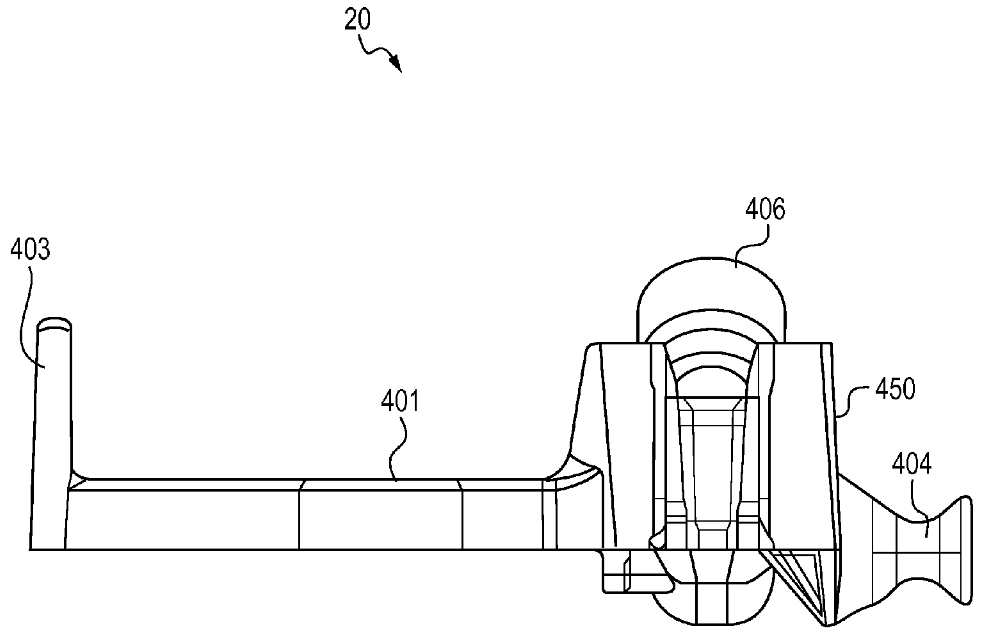
FIG. 11 illustrates a left side view of the vise apparatus with the bending fixture shown in FIG. 4 to FIG. 6.
Figure 12:
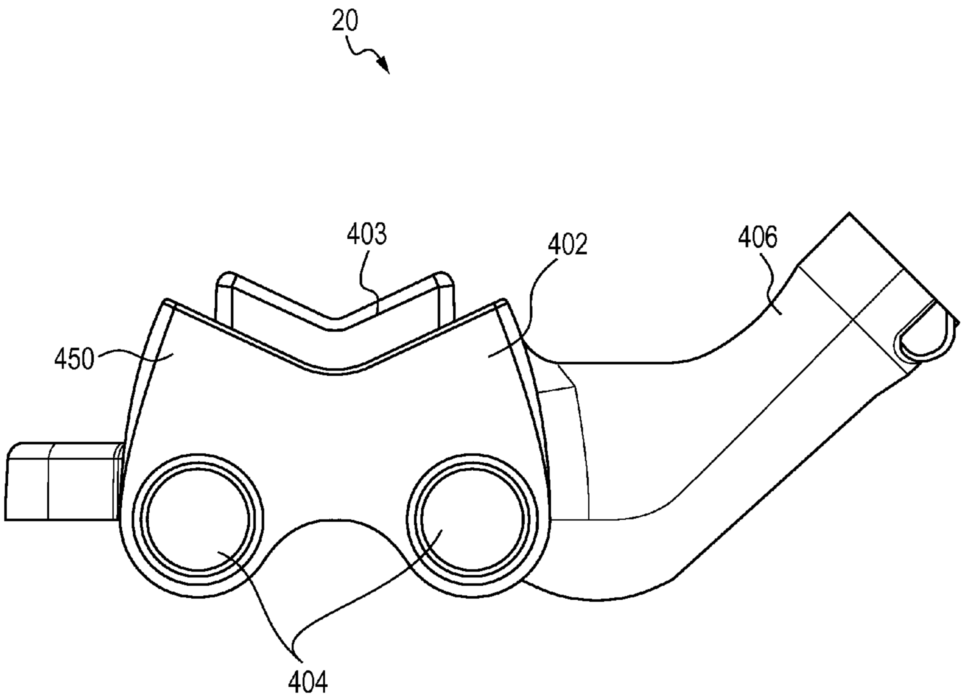
FIG. 12 illustrates a front view of the vise apparatus with the bending fixture shown in FIG. 4 to FIG. 6.

FIG. 3 illustrates a bending force diagram of the vise apparatus 10 with a bending fixture shown in FIG. 1. When the projections 100 are arranged on the top face of the base portion 401, a total force F is required to be applied by an operator. The total force F is equal to effort required for bending the workpiece 412. The vise apparatus 10 with the bending fixture of the prior art poses difficulty in inserting the workpiece 412 for the bending operation. Further the bending fixture of the prior art cannot be integrally cast with the vise apparatus 10 as the apertures 101 are required to be separately drilled and machined, thus, increasing the cost of production.

FIG. 4 to FIG. 28 illustrate different views and aspects of a vise apparatus 20 with various bending fixture embodiments according to the present disclosure. The vise apparatus 20 illustrated in FIG. 4 to FIG. 28 is a bench chain vise. However, the bending fixture of the present disclosure can be included with other types of vises. The vise apparatus 20 has a holding arrangement for clamping a workpiece. The holding arrangement of the bench chain vise illustrated in FIG. 4 to FIG. 28 generally comprises a jaw arrangement including a recessed receiving region 402 and one or more toothed jaws 405, a rear support 403, a gooseneck 406, a chain 411 (FIGS. 13 to 23*b*), a handle 409 (FIGS. 13 to 23*b*) and an operative and substantially vertical front face 450. FIG. 13 to FIG. 23*b* specifically illustrate a chain used with the vise.

Figure 13:
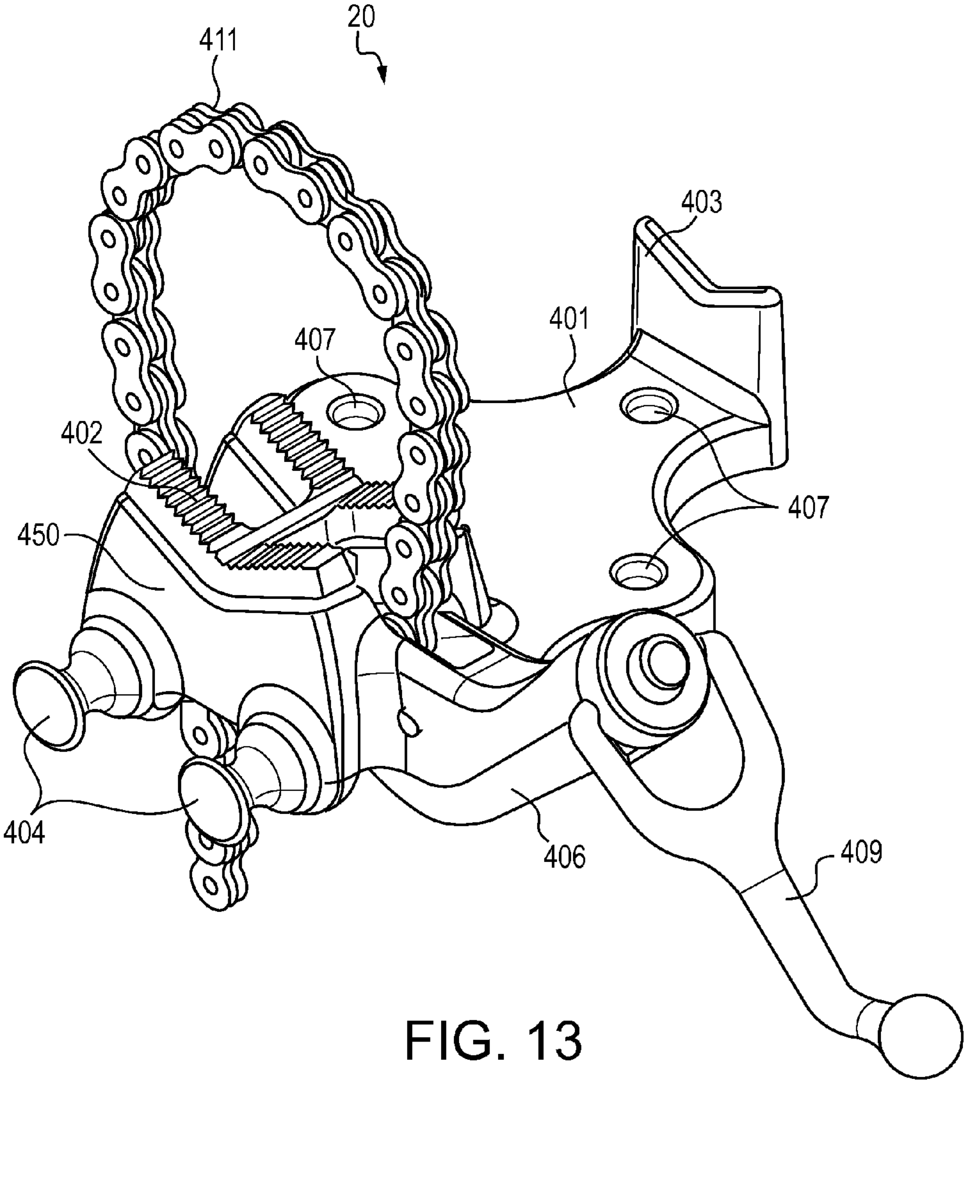
FIG. 13 to FIG. 15 illustrate different perspective views of a vise apparatus and bending fixture in accordance with the present subject matter with a chain arrangement.
Figure 14:
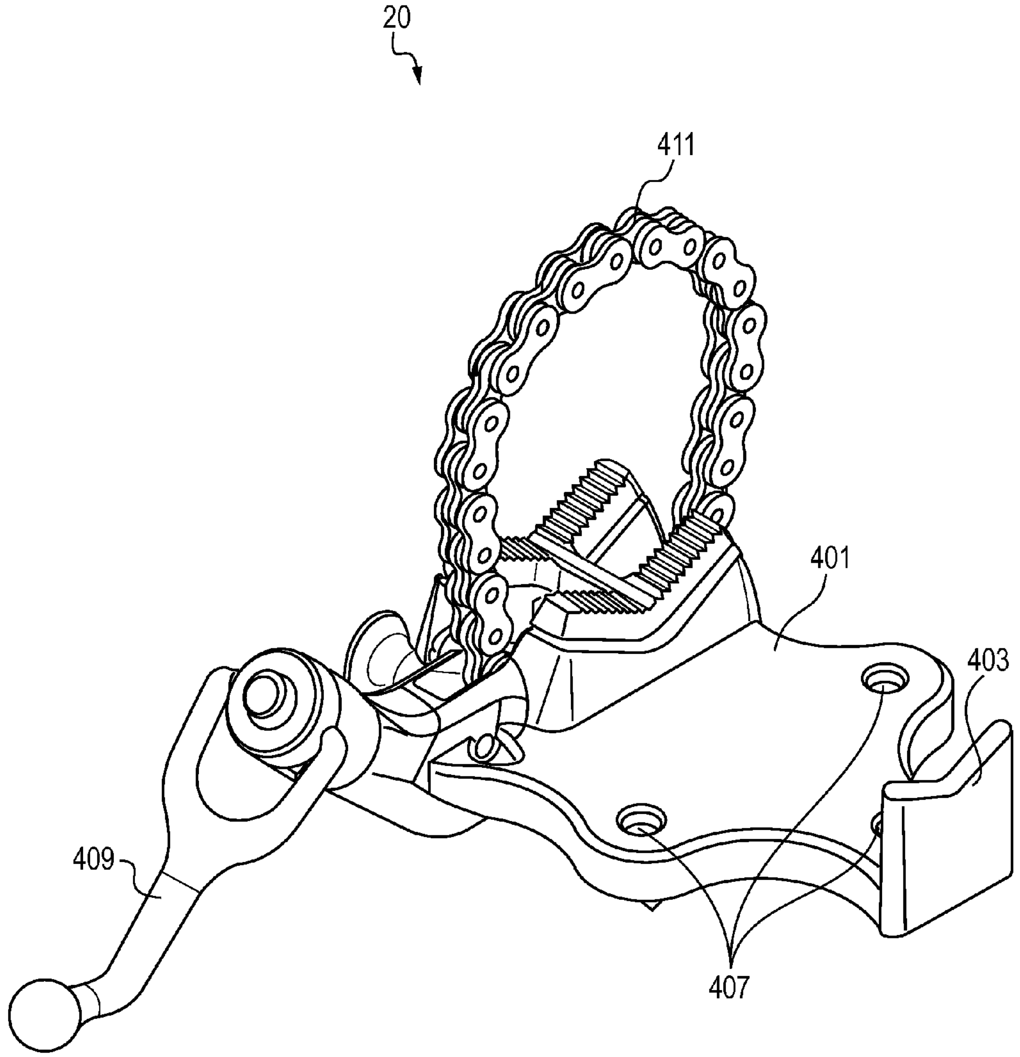
Figure 15:
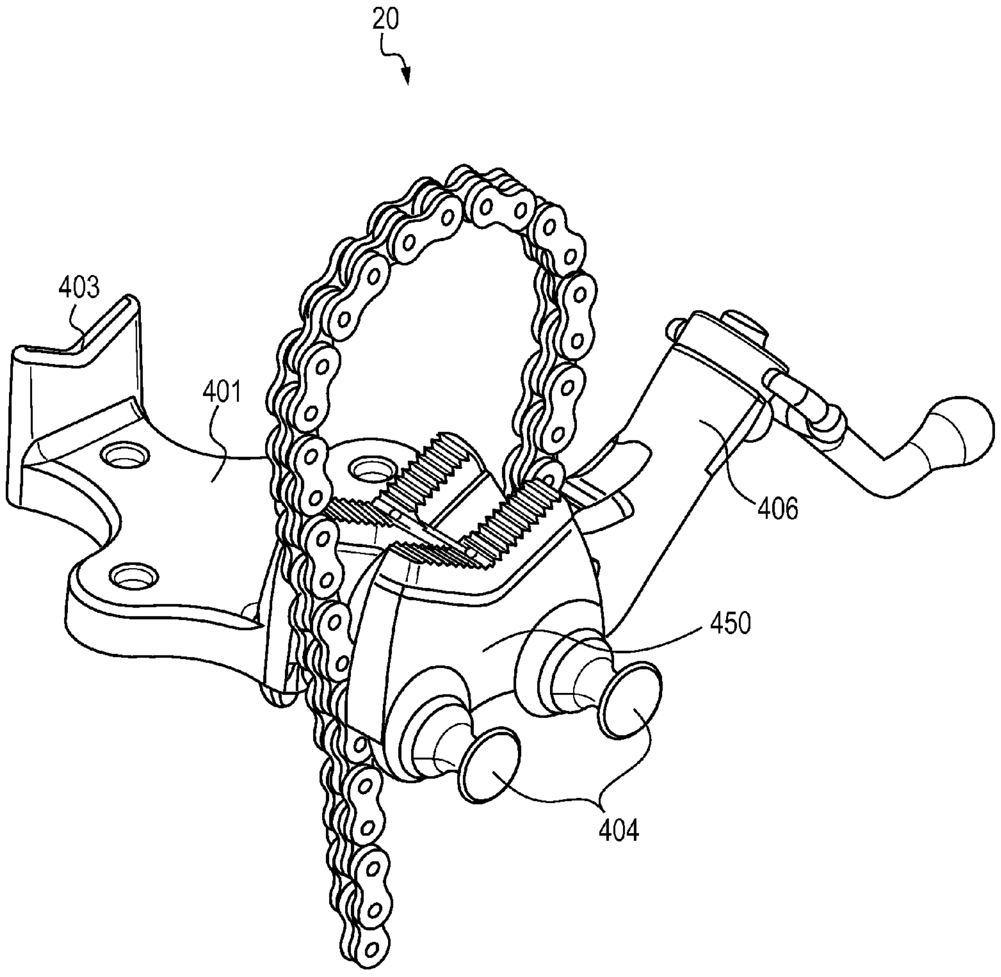
Figure 16:
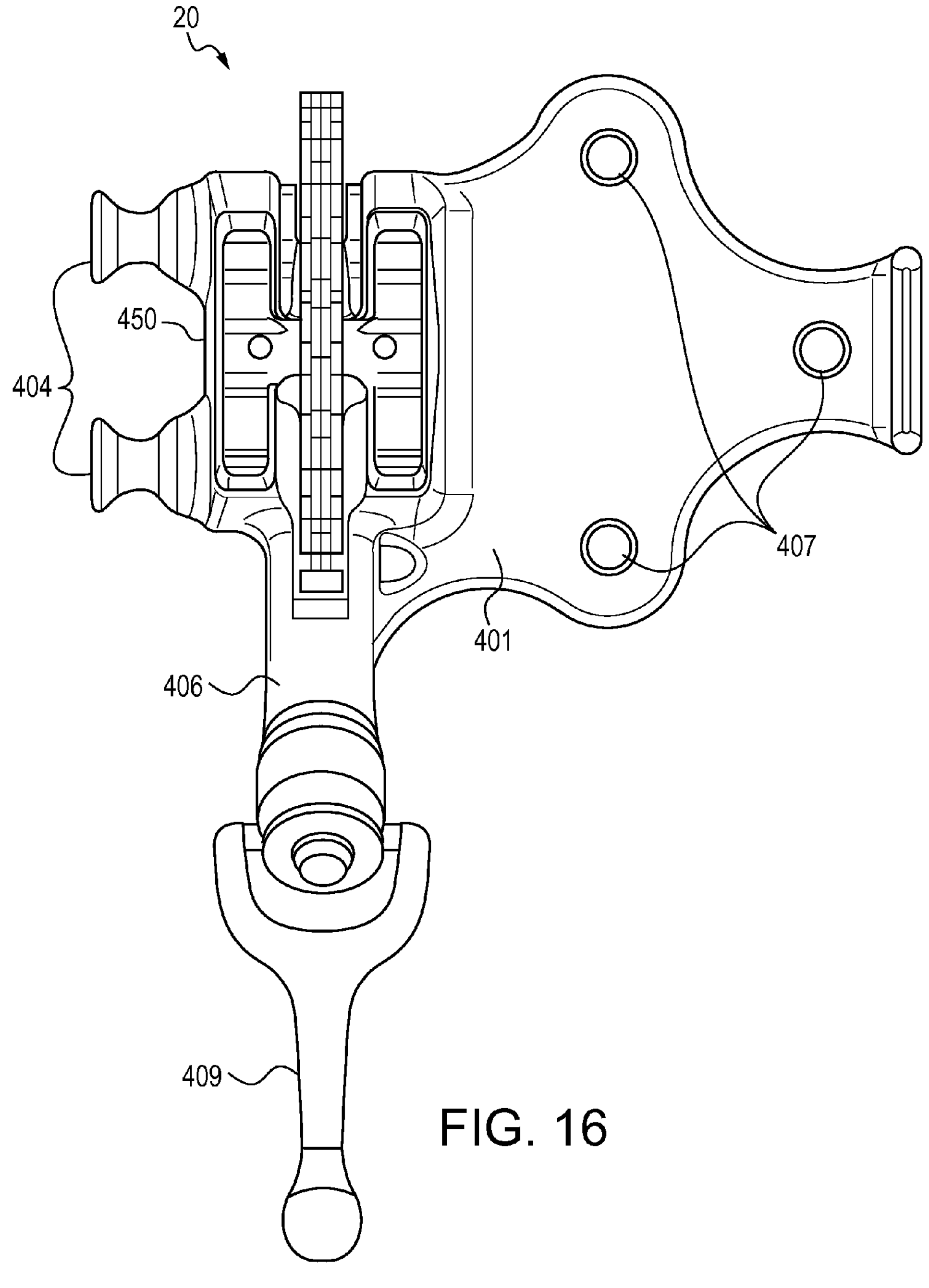
FIG. 16 illustrates a top view of the vise apparatus shown in FIG. 13 to FIG. 15.
Figure 17:
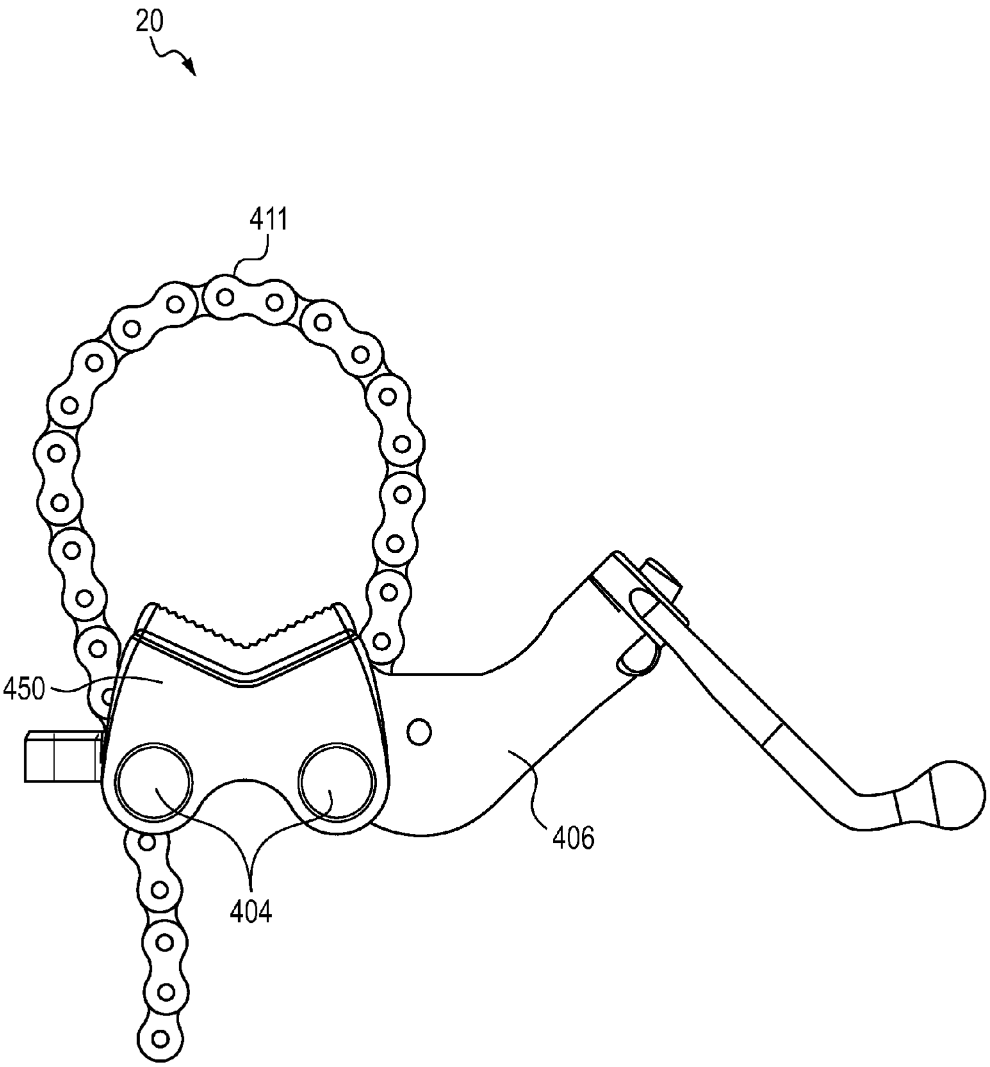
FIG. 17 illustrates a front view of the vise apparatus shown in FIG. 13 to FIG. 15.
Figure 18:
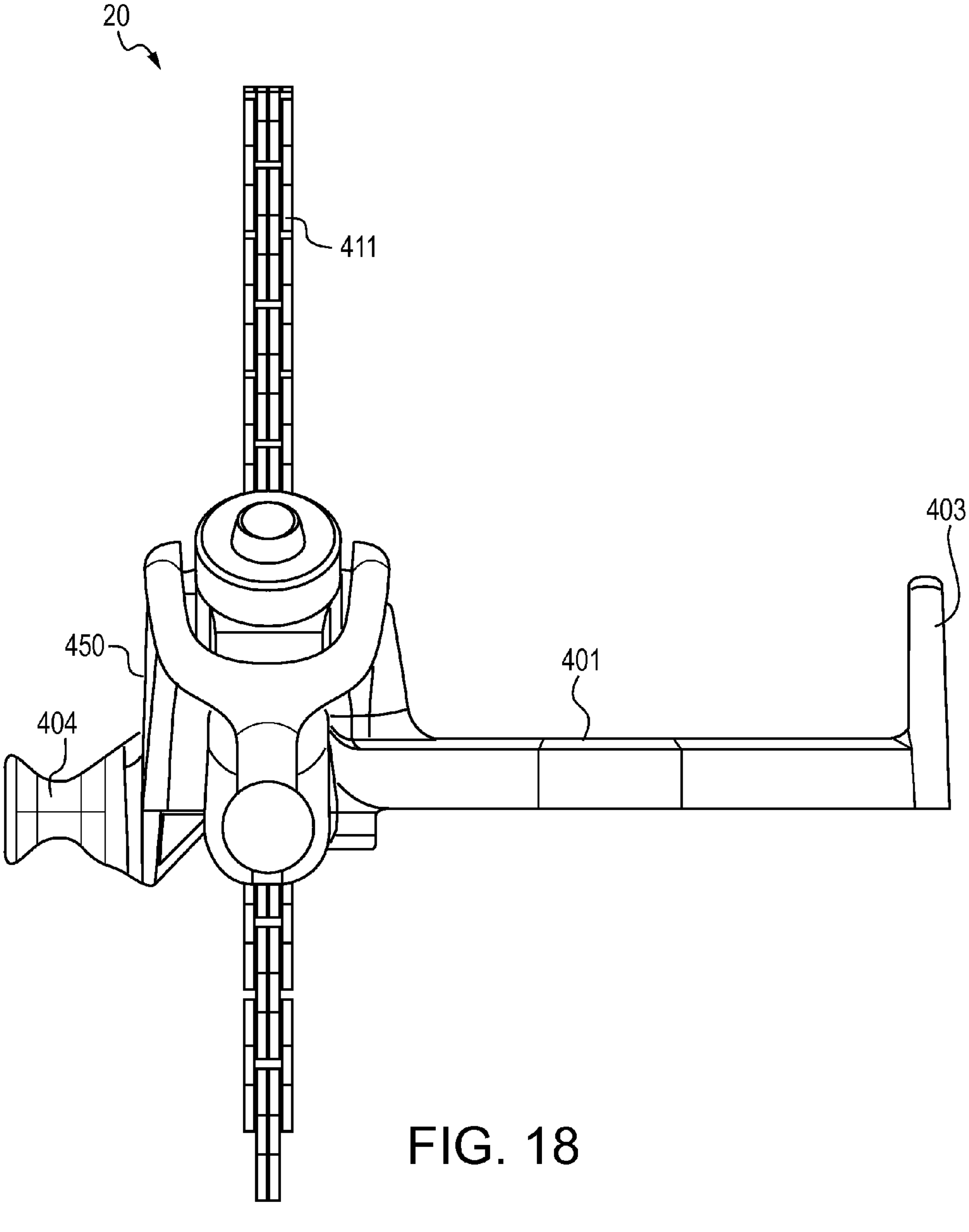
FIG. 18 illustrates a right side view of the vise apparatus shown in FIG. 13 to FIG. 15.
Figure 19:
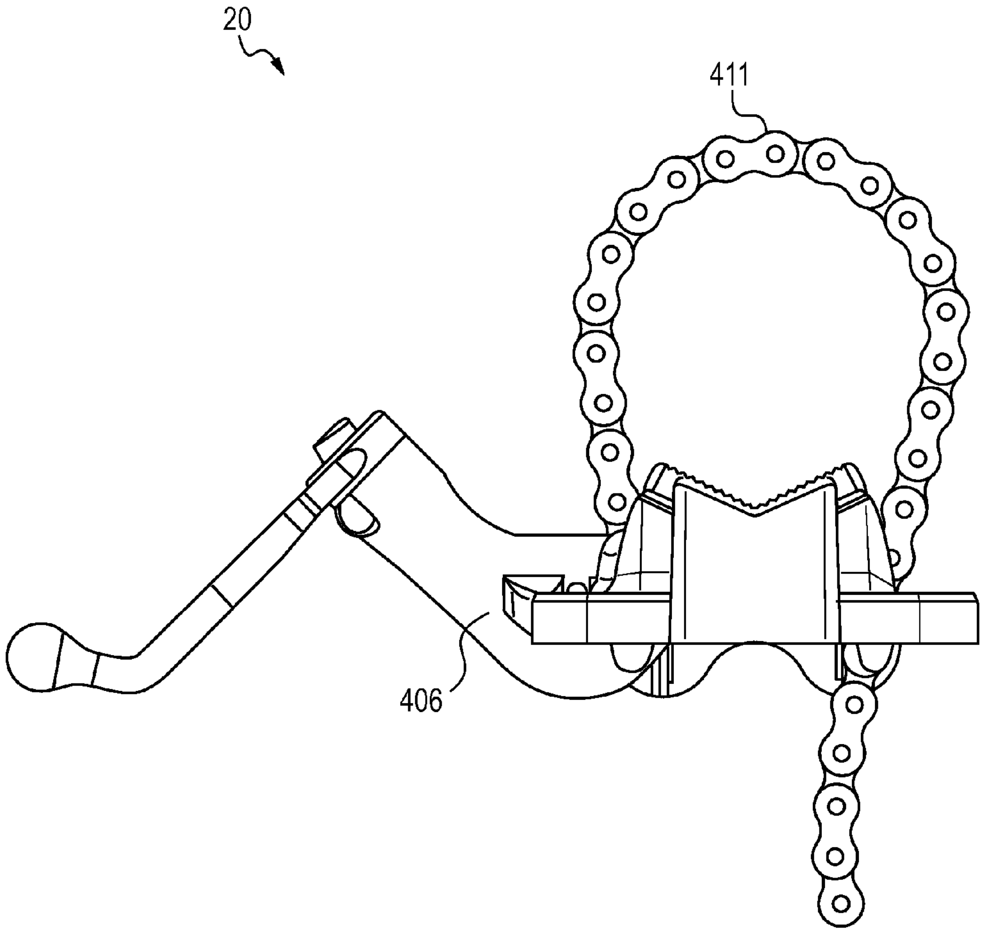
FIG. 19 illustrates a rear view of the vise apparatus shown in FIG. 13 to FIG. 15.
Figure 20:
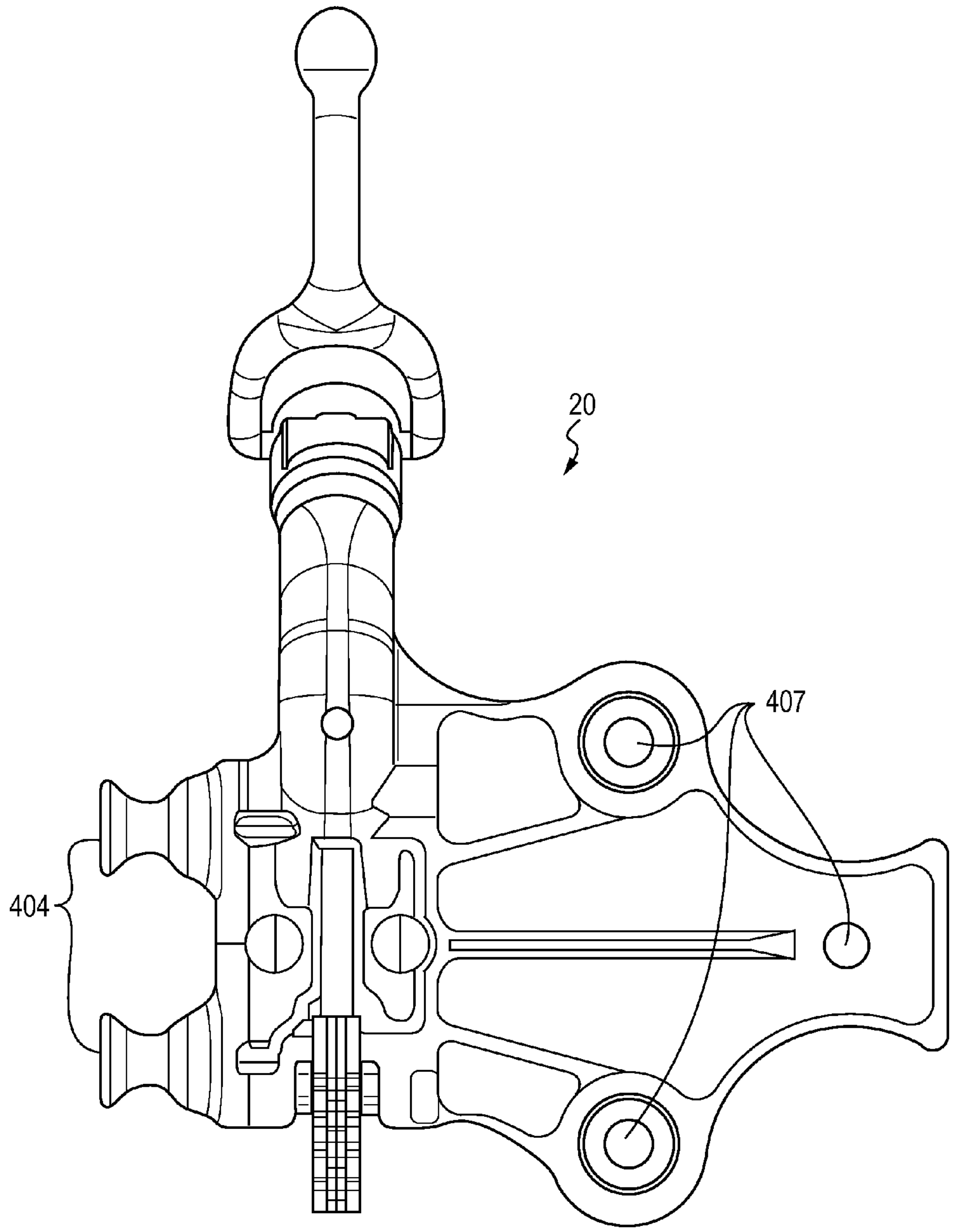
FIG. 20 illustrates a bottom view of the vise apparatus shown in FIG. 13 to FIG. 15.
Figure 21:
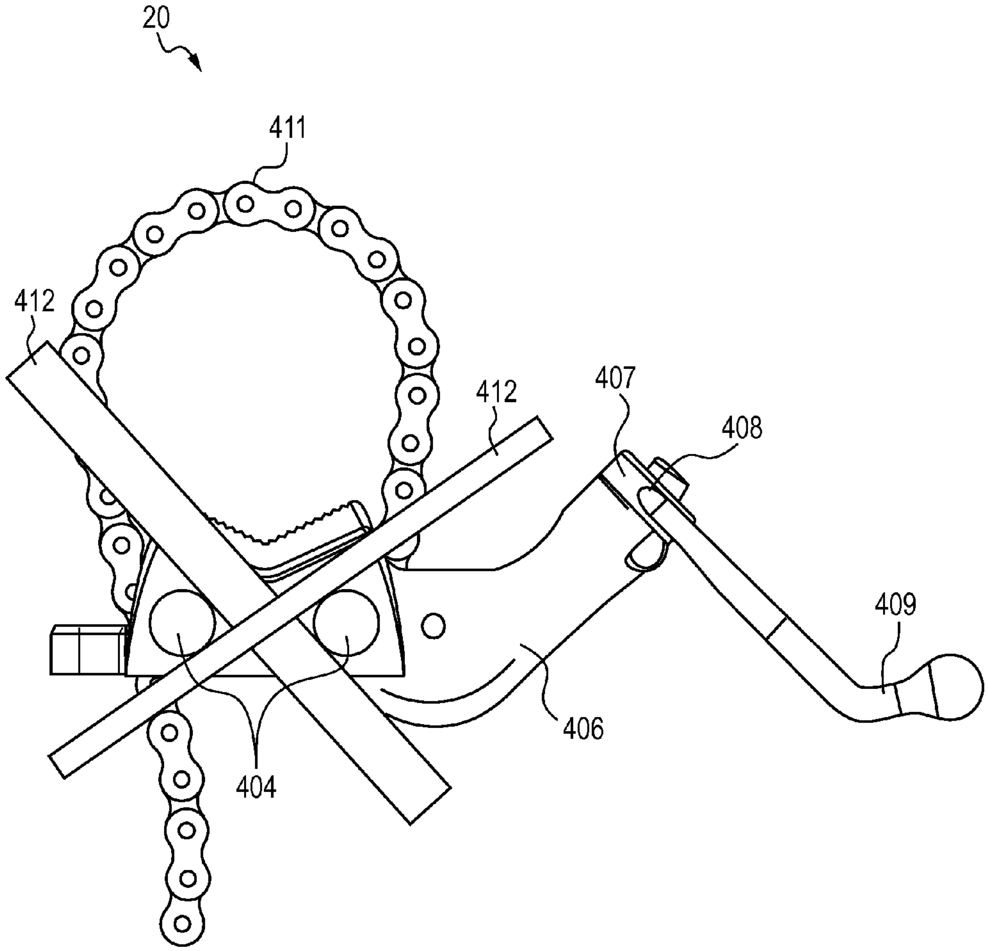
FIG. 21 illustrates various orientations of a workpiece in the bending fixture of the vise apparatus of FIG. 13 to FIG. 15 in accordance with the present subject matter.

The vise apparatus 20 includes a base portion 401 provided with a plurality of apertures 407 and at least one bending fixture. The vise apparatus 20 is fitted to a workbench by fixing arrangements such as threaded fasteners through apertures 407. The bending fixture comprises a plurality of projections 404 at the operative and substantially vertical front face 450 of the vise apparatus 20. The projections 404 serve to support a workpiece 412 such as shown in FIG. 21 in order to carry out one or more bending operations on the workpiece 412. The projections 404 are preferably sized and/or shaped to at least contact and generally receive a workpiece or region thereof during bending of the workpiece. As will be appreciated, the workpiece is contacted with at least one of the projections and bent or otherwise deformed at least partially around the projection(s). The bending operations are carried out by inserting the workpiece 412 in between the projections 404 provided on the operative and substantially vertical front face 450 of the base portion 401. FIG. 13 to FIG. 15 illustrate different perspective views of the bending fixture shown in FIG. 4 to FIG. 12, incorporated in a bench chain vise and depict a chain 411 and a handle 409. FIG. 16 to FIG. 20 illustrate different views of the vise apparatus 20 shown in FIG. 13 to FIG. 15.

FIG. 21 illustrates various orientations in which the workpiece 412 can be positioned within the bending fixture shown in FIG. 13 to FIG. 20. The workpiece 412 is positioned relative to the projections 404 such that one point or region of the workpiece is in contact with one of the projections 404 while another point or region of the workpiece 412 is in contact with the other projection 404. The points of contact of the workpiece with the projections 404 are located opposite each other at a distance along the length of the workpiece 412. Thus, the bending fixture with the projections 404 provides an extended angle for inserting the workpiece 412. This enables bending operations to be carried out by a left handed operator as well as a right handed operator.

Figure 22:
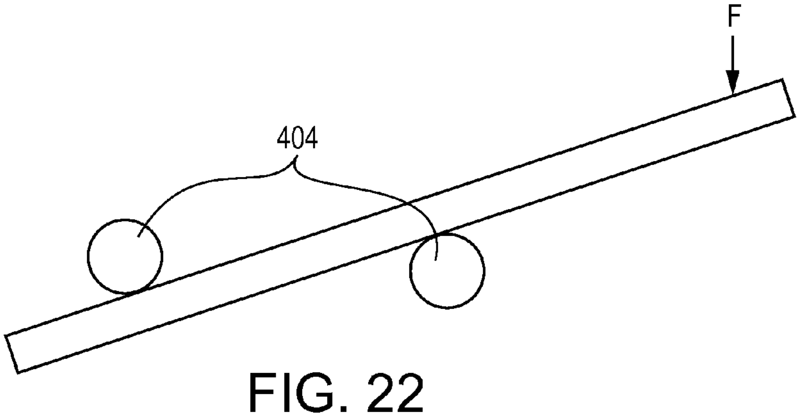
FIG. 22 illustrates a schematic representation of a bending force diagram for the vise apparatus and bending fixture shown in FIG. 21.

FIG. 22 illustrates a schematic representation of a bending force diagram for the vise apparatus 20 shown in FIG. 21. When the projections 404 are arranged along the operative and substantially vertical front face 450 for bending operations, an operator is required to use comparatively less force, F. This is because bending is assisted by the operator's body weight and the force of gravity, g.

Figure 23A:
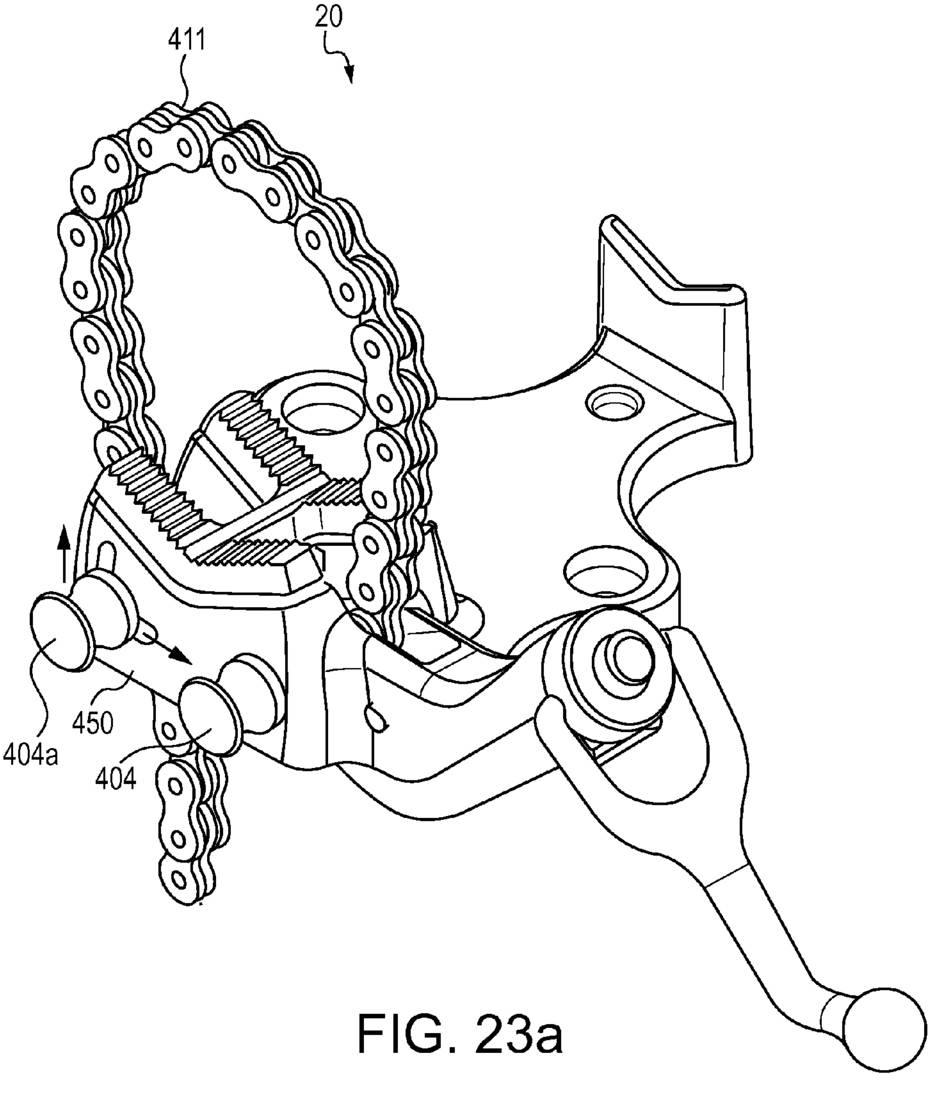
FIG. 23*a* and FIG. 23*b* illustrate additional vise apparatuses with bending fixtures in accordance with the present subject matter.
Figure 23B:
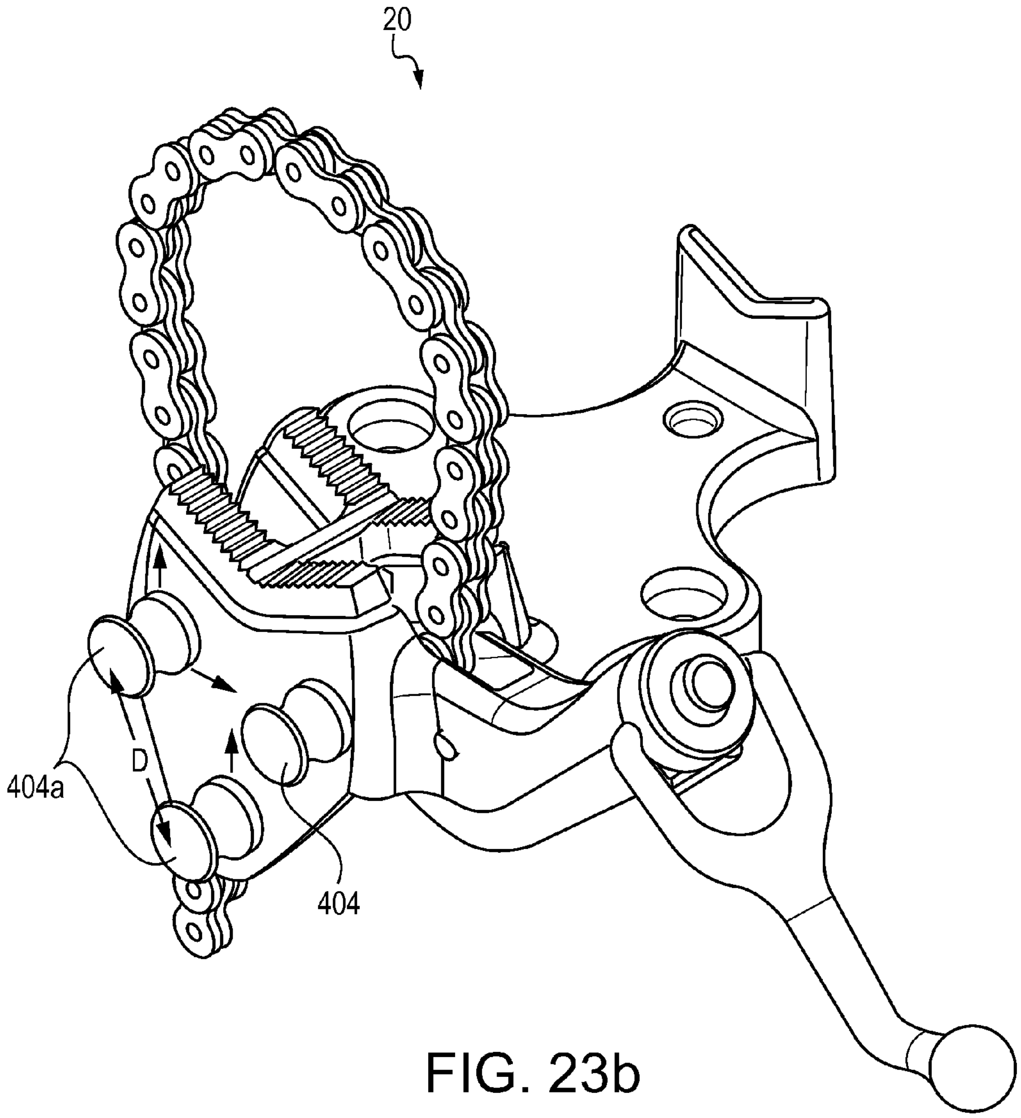

FIG. 23*a* and FIG. 23*b* illustrate a vise apparatus 20 with at least one displaceable projection 404*a*. At least one of the projections 404 is integrally cast or press fitted and at least one of the displaceable projections 404*a* is displaceably mounted on the operative and substantially vertical front face 450 of the holding arrangement. The displaceable projections 404*a* of the bending fixture, shown in FIG. 23*a* and FIG. 23*b*, may be provided with a front bending portion and a threaded stem for mounting the displaceable projections 404*a* on the operative and substantially vertical front face 450. The operative and substantially vertical front face 450 of the holding arrangement is provided with locational holes for fitting at least one of the displaceable projections 404*a*. The displaceable projection 404*a* is mounted by threading the threaded stem of the displaceable projection 404*a* within the locational holes. The displaceable projections 404*a* are displaceable in a horizontal and/or a vertical direction along slots, as shown in FIG. 23*a* and FIG. 23*b*. This enables an operator to adjust the center distance D between the projection(s) 404 and the displaceable projection(s) 404*a*. Such adjustment enables or promotes positioning workpieces 412 having varied cross sections and lengths.

Figure 24A:
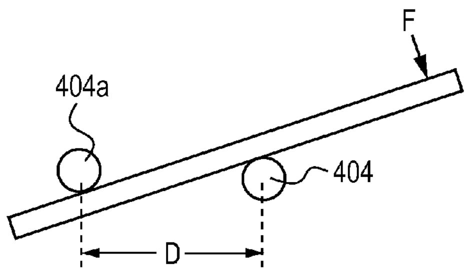
FIG. 24*a* and FIG. 24*b* illustrate schematic representations of bending force diagrams for the vise apparatuses shown in FIG. 23*a* and FIG. 23*b*, respectively.
Figure 24B:
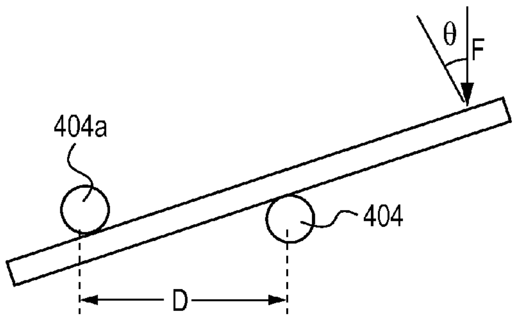

FIG. 24*a* and FIG. 24*b* illustrate a schematic representation of bending force diagrams for the vise apparatuses 20 shown in FIG. 23*a* and FIG. 23*b*, respectively. When the distance D between the center of the projections 404 and the displaceable projections 404*a* is reduced, force F required to be applied by the operator to bend the workpiece 412 is reduced. This helps in reducing the effort required by the operator in bending the workpiece 412.

Figure 25:
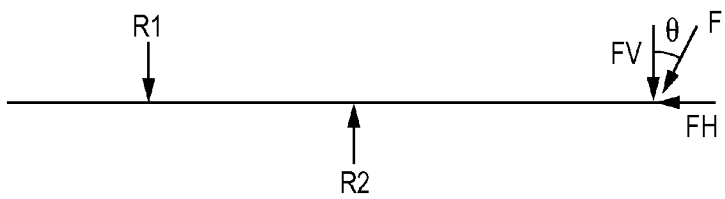
FIG. 25 illustrates a schematic representation of a free body diagram for the vise apparatuses shown in FIG. 23*a* and FIG. 23*b*.

FIG. 25 illustrates a schematic representation of a free body diagram for the vise apparatuses shown in FIG. 23*a* and FIG. 23*b*. When the workpiece 412 to be bent is positioned between the fixed projection 404 and the displaceable projection 404*a*, arranged as shown in FIG. 24*b*, reaction forces R1 and R2 are exerted on the workpiece 412, as shown in the FIG. 25. The reaction force R1 is in an opposite direction to that of the reaction force R2. A total force F is required to be applied by an operator in order to bend the workpiece 412 in order to overcome the reaction forces R1 and R2. As shown in FIG. 25, the force F is a function of "θ" and the horizontal component FH or "θ" and the vertical component FV. When the value of "θ" is small, the value of the vertical component FV approaches the total force F. Hence, the effort is reduced by adjusting the center distance D between the projections 404 and 404*a*, as shown in the FIG. 24*b*.

The projections 404 and the displaceable projections 404*a* have a predetermined shape. Typically, the shape is selected from the group consisting of a spool shape, a bobbin shape, a hemi-capstan shape and an arcuate shape as shown in FIG. 4 to FIG. 21. The spool shaped projections are illustrated in FIG. 23*a* and FIG. 23*b*.

Figure 26:
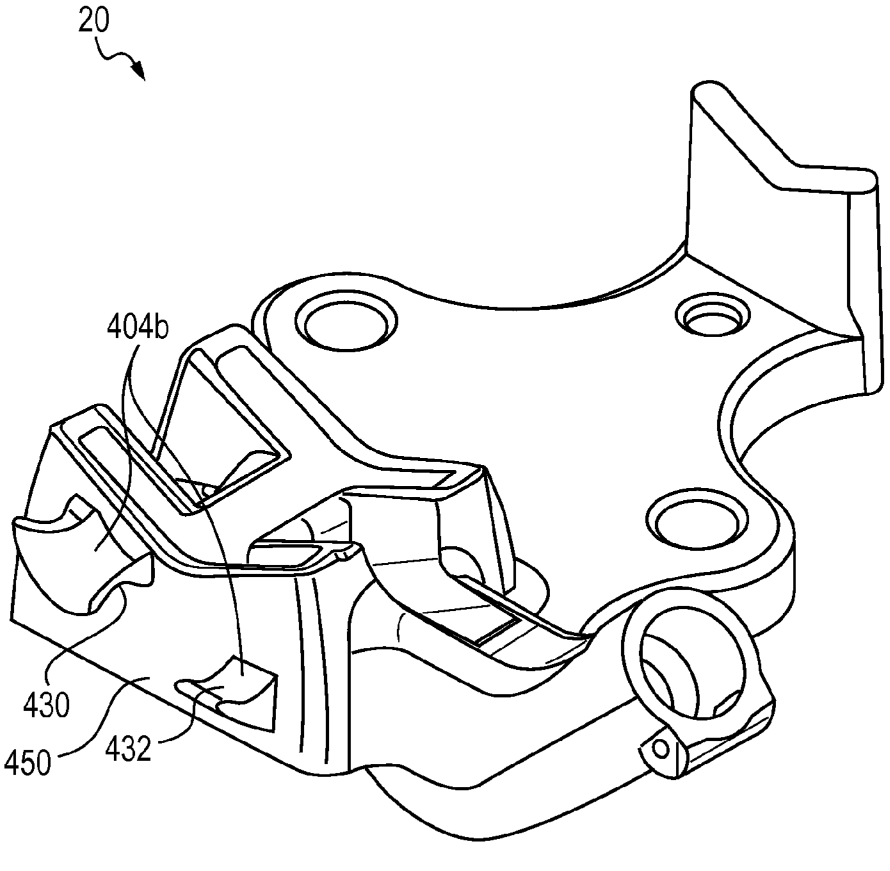
FIG. 26 and FIG. 27 illustrate alternate embodiments of the bending fixture in accordance with the present subject matter.

FIG. 26 illustrates at least one arcuate shaped projection 404*b*, formed on the operative and substantially vertical front face 450 of the holding arrangement for accommodating a workpiece having a varied cross section. For example, referring to FIG. 26, an arcuate shaped projection 404*b* which extends from the vertical front face 450 can be configured so as to provide a downwardly directed concave receiving channel along its underside such as surface 430. Similarly, the arcuate shaped projection 404*b* can also be configured to provide a generally horizontal or an upwardly directed concave receiving channel along its topside such as surface 432. As will be appreciated, the receiving channels or surfaces 430, 432 contact workpieces during bending of the workpieces. Multiple arcuate shaped projections 404*b* can be provided, and they can also be configured to include different sizes, curvatures, and orientations.

Figure 27:
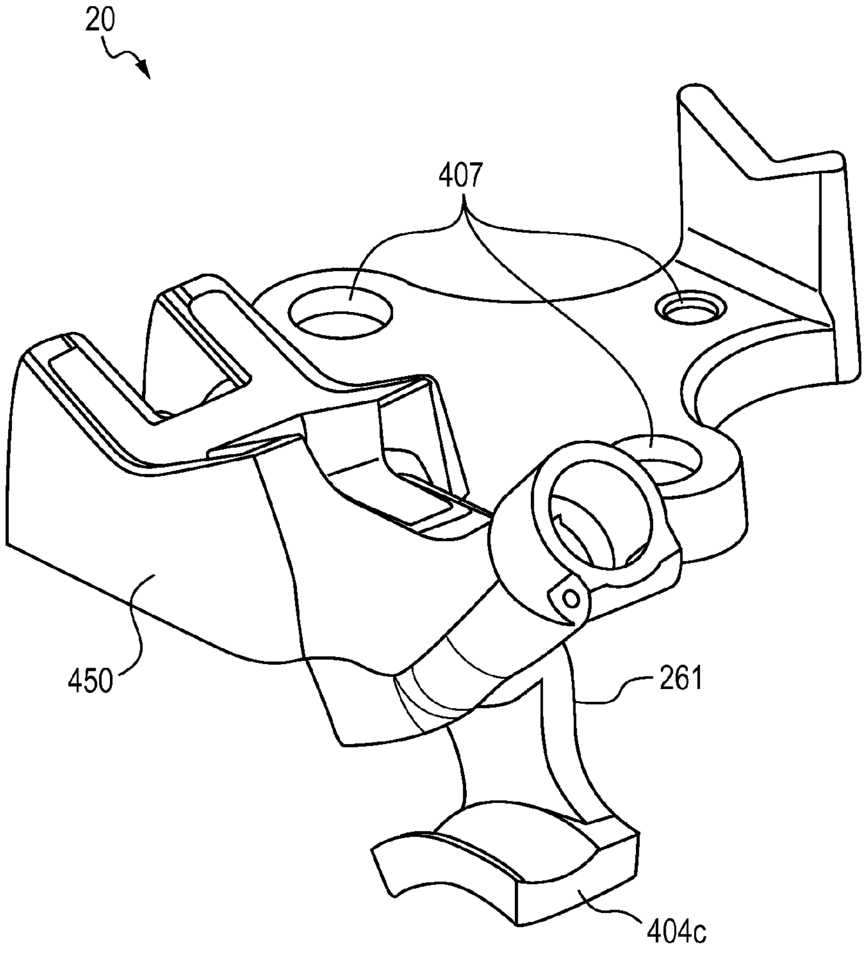

FIG. 27 illustrates an alternate embodiment of the present subject matter in which the bending fixture is a hickey style bending fixture. The projection is an element with an arcuate shaped member 404*c* extending from a neck portion 261. The arcuate shaped member 404*c* is generally disposed at a distal end of the neck portion 261. The arcuate shaped member 404*c* is substantially orthogonal to the neck portion 261. The neck portion 261 extends from a plane substantially perpendicular to the front face 450 of the holding arrangement. In the particular version illustrated in FIG. 27, the arcuate shaped member 404*c* includes an upwardly directed surface which may further define a concave channel for receiving a workpiece.

Figure 28A:
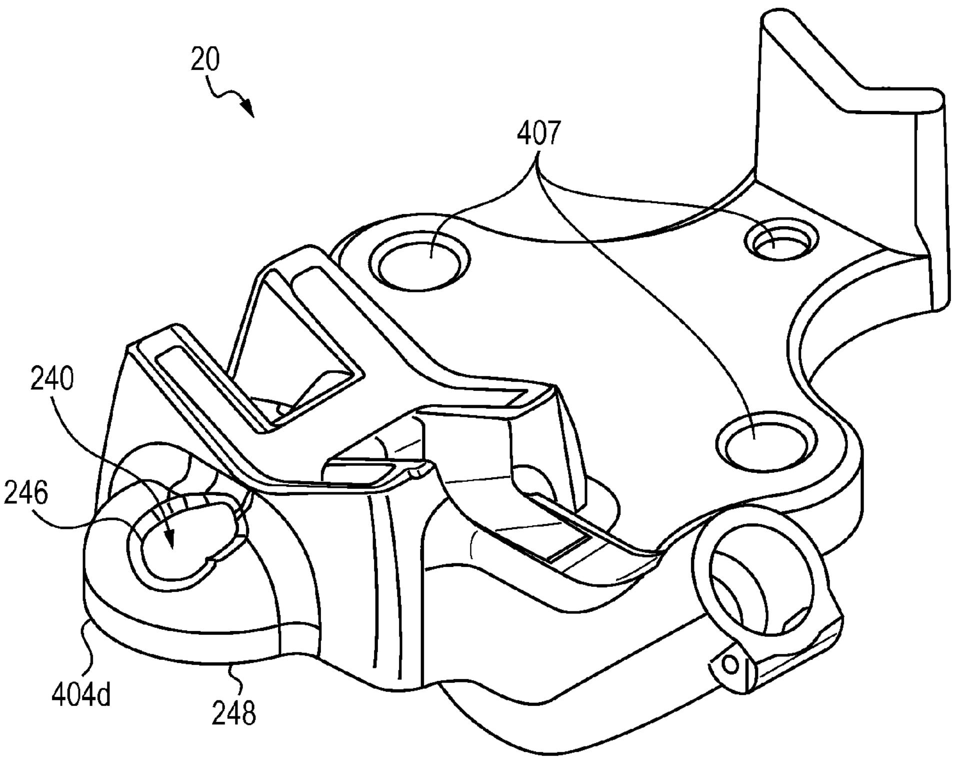
FIG. 28*a* illustrates an alternate embodiment of the bending fixture in accordance with the present subject matter.
Figure 28B:
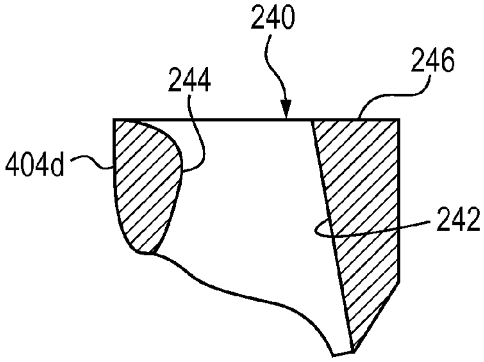
FIG. 28*b* illustrates a cross sectional view of the embodiment of the bending fixture shown in FIG. 28*a*.

FIG. 28*a* illustrates an alternate embodiment wherein the bending fixture is an element 404*d* with a through hole 240, as shown in FIG. 28*b*. The element 404*d* with the through hole 240 is mounted on or otherwise formed with the operative and substantially vertical front face 450 of the holding arrangement. The through hole 240 enables a workpiece to be bent. The through hole 240 has a particular profile, shown in FIG. 28*b*, which helps in guiding and bending the workpiece upon insertion through the through hole 240. Specifically, in certain versions of the element 404*d*, the through hole 240 extends vertically through the element 404*d*. The profile of the through hole 240 shown in FIG. 28*b* includes at least one internal wall 242 or wall region that extends from a top surface 246 of the element 404*d*, which is straight or linear when viewed in cross section such as FIG. 28*b*. And, the through hole 240 also includes an inwardly projecting shoulder 244 having a generally rounded contour as shown in FIG. 28*b*. Furthermore, the interior walls defining the through hole 240 generally diverge from one another as the walls extend from the top surface 246 or the shoulder 244 to a bottom surface 248 of the element 404*d*.

The vise apparatus as described herein facilitates ease in bending a workpiece. Also, the vise apparatus of the present disclosure provides ease in inserting and pulling the workpiece. Additionally, the vise apparatus of the present disclosure provides a wide angle of operation while inserting and puffing of the workpiece. Further, the vise apparatus of the present disclosure further enables the workpiece to be inserted from any side of the operator. Again, the vise apparatus of the present disclosure is cost effective. A conventional bending fixture requires the workpiece to be bent in a horizontal plane and hence is required to be pulled or pushed by the operator. However, performing bending operations using the bending fixture provided on the vise apparatus of the present subject matter, the operator is able to apply his or her own body weight to bend the workpiece and is further assisted by the force of gravity.

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

The use of the expression “at least” or “at least one” suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantifies fall within the scope of the disclosure, unless there is a statement in the specification specific to the contrary.

Many other benefits will no doubt become apparent from future application and development of this technology.

All patents, applications, and articles noted herein are hereby incorporated by reference in their entirety.

As described hereinabove, the present subject matter overcomes many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A vise apparatus having a base portion and a holding arrangement for holding an elongated workpiece to be operated thereon, said vise apparatus comprising a bending fixture having at least one projection, said bending fixture adapted to support and enable gravity assisted bending of the elongated workpiece, wherein said bending fixture is located on an operative and substantially vertical front face of the holding arrangement.

2. The vise apparatus as claimed in claim 1, wherein said at least one projection has a predetermined shape, said predetermined shape being selected from the group consisting of a spool shape, a bobbin shape, a hemi-capstan shape and an arcuate shape.

3. The vise apparatus as claimed in claim 1, wherein said at least one projection is an element with a through hole.

4. The vise apparatus as claimed in claim 3, wherein said through hole has a predetermined profile for bending the workpiece.

5. The vise apparatus as claimed in claim 1, wherein said at least one projection is an element with an arcuate shaped member extending from a neck portion, said arcuate shaped member being substantially orthogonal to said neck portion, said neck portion extending from a front face of the holding arrangement.

6. The vise apparatus as claimed in claim 1, wherein said bending fixture is integral with an operative front face of the holding arrangement.

7. The vise apparatus as claimed in claim 1, wherein at least one of said projections is displaceable.

8. The vise apparatus as claimed in claim 1, wherein said operative and substantially vertical front face of the holding arrangement is provided with locational holes for receiving said bending fixture.

9. The vise apparatus as claimed in claim 8, wherein said at least one projection has a front bending portion and a threaded stem, said threaded stem being adapted to be threadably received in said locational hole.

10. The vise apparatus as claimed in claim 1, wherein said bending fixture is provided on the operative front face of the holding arrangement by a method selected from the group consisting of casting, threading, fastening, welding and press fitting.

11. A vise apparatus and bending fixture comprising:

a base portion;

a jaw arrangement including a recessed receiving region and one or more toothed jaws;

wherein at least one of the base portion and the jaw arrangement provides a substantially vertical front face;

at least one projection extending from the front face, the at least one projection adapted for contact with a workpiece during bending of the workpiece.

12. The vise apparatus and bending fixture of claim 11 wherein the jaw arrangement and one or more toothed jaws are directed upward from the base portion and the apparatus and bending fixture further comprise:

a rear support extending upwardly from the base portion and spaced from the jaw arrangement.

13. The vise apparatus and bending fixture of claim 11 wherein the at least one projection includes two projections.

14. The vise apparatus and bending fixture of claim 11 wherein the at least one projection includes a projection that can be selectively positioned along the substantially vertical front face.

15. The vise apparatus and bending fixture of claim 11 wherein the at least one projection is in the form of an arcuate shaped projection defining a concave receiving channel.

16. The vise apparatus and bending fixture of claim 11 further comprising:

a neck extending downwardly from at least one of the base portion and the jaw arrangement, the neck defining a distal end;

an arcuate shaped projection disposed at the distal end of the neck, the arcuate shaped projection defining a concave receiving channel.

17. The vise apparatus and bending fixture of claim 11 wherein the at least one projection defines a vertically extending through hole adapted for contact with a workpiece during bending of the workpiece.

18. A vise apparatus and bending fixture comprising:

a base portion;

a jaw arrangement disposed on or adjacent to the base portion, the jaw arrangement including at least one jaw member;

a support disposed on or adjacent to the base portion and spaced from the at least one jaw member by the base portion extending therebetween;

wherein at least one of the base portion, the jaw arrangement, and the support provide a substantially vertical front face;

a first projection extending from the front face and a second projection extending from the front face; the first projection and the second projection constituting the bending fixture for receiving a workpiece and bending the workpiece upon application of a force to the workpiece.

19. The vise apparatus and bending fixture of claim 18 wherein one of the first projection and the second projection is selectively positionable along the substantially vertical front face.

* * * * *